United States Patent [19]

Braithwaite

[11] Patent Number: 4,518,412
[45] Date of Patent: May 21, 1985

[54] PARISON SCREENING IN A GLASSWARE FORMING MACHINE

[75] Inventor: David Braithwaite, Doncaster, England

[73] Assignee: Emhart Industries, Inc., Farmington, Conn.

[21] Appl. No.: 433,130

[22] PCT Filed: Feb. 22, 1982

[86] PCT No.: PCT/GB82/00055
§ 371 Date: Sep. 30, 1982
§ 102(e) Date: Sep. 30, 1982

[87] PCT Pub. No.: WO82/02875
PCT Pub. Date: Sep. 2, 1982

[30] Foreign Application Priority Data

Feb. 27, 1981 [GB] United Kingdom ............... 8106183

[51] Int. Cl.³ .............................................. C03B 9/38
[52] U.S. Cl. ...................................... 65/244; 65/267; 65/355
[58] Field of Search ............... 65/243, 265, 267, 319, 65/355, 244

[56] References Cited

U.S. PATENT DOCUMENTS

| 1,331,772 | 2/1920 | Kadow | 65/265 |
| 1,499,523 | 7/1924 | Hall | 65/265 |
| 1,800,191 | 4/1931 | Lorenz | 65/265 |
| 2,702,444 | 7/1949 | Rowe | 65/243 |

FOREIGN PATENT DOCUMENTS

| 2422603 | 4/1979 | France . |
| 1491859 | 11/1973 | United Kingdom . |
| 1599801 | 4/1978 | United Kingdom . |

Primary Examiner—William Smith
Assistant Examiner—Michael K. Boyer
Attorney, Agent, or Firm—Arthur Moore

[57] ABSTRACT

A glassware forming machine having a blank station (A) at which a parison is formed, an intermediate station (B) at which the parison is allowed to reheat, and a blow station (C) at which the parison is formed into an article of glassware as a patter plate (12) at the intermediate station (B). The patter plate (12) is movable between an operative position in which it screens the underside of the parison from updraughts of air and an inoperative position in which the patter plate (12) is not beneath the parison. The machine also comprises moving means (17) operable to move the patter plate (12) between its operative and inoperative position at appropriate times in the cycle of operation of the machine.

12 Claims, 4 Drawing Figures

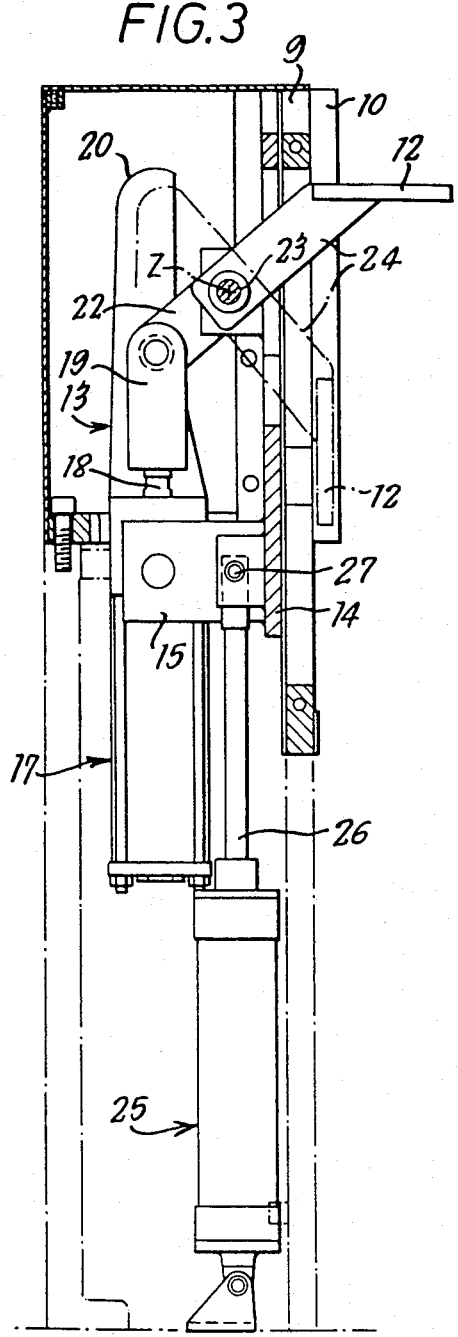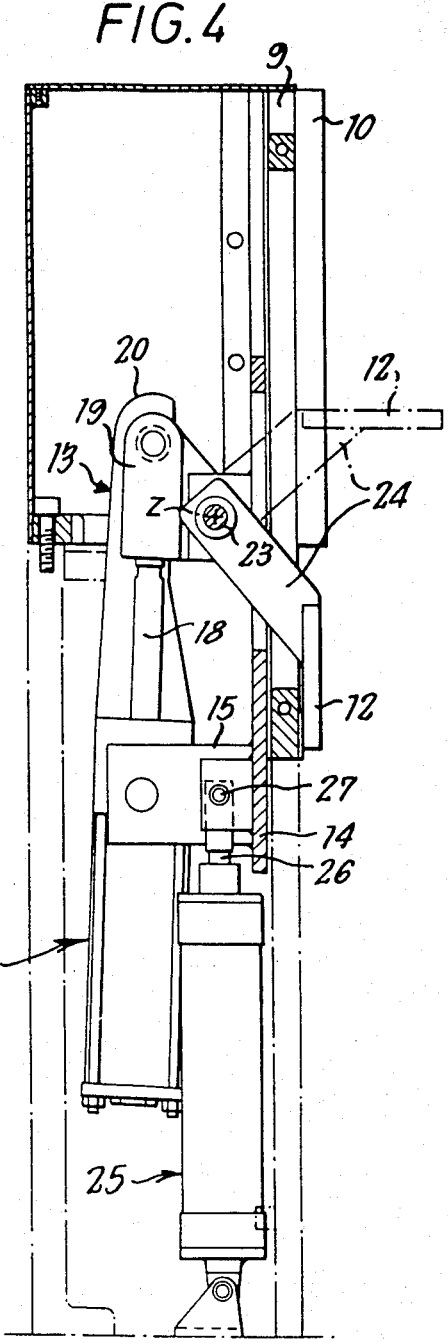

PARISON SCREENING IN A GLASSWARE FORMING MACHINE

TECHNICAL FIELD

This invention is concerned with a glassware forming machine having three stations, namely a blank station at which a parison is formed from a gob of molten glass, an intermediate station at which the parison is allowed to reheat, and a blow station at which the parison is formed into an article of glassware.

BACKGROUND ART

A glassware forming machine of the so-called "Individual Section" type normally has a blank station at which a parison is formed from a gob of molten glass and a blow station at which the parison is formed into an article of glassware. The parison formed at the blank station is transferred to the blow station to be blown. It has long been recognised that it is desirable to allow the parison to reheat before being moulded at the blow station. This reheating serves to allow portions of the parison which where in contact with a mould at the blank station and have therefore become chilled to be reheated by other parts of the parison transferring heat thereto. In a more recently proposed type of individual section machine, see U.K. Patent Specification No. 1599801, a reheating intermediate station is provided between the blank station and the blow station so that parisons can be allowed to reheat at the intermediate station without causing delay in the operation of the blow station. However, it has been found that parisons at the intermediate station are subject to being chilled by up drafts of cold air created by the cold air displacing air heated by the parison. The provision of a fixed screen beneath the parison to prevent such up drafts is not practical because of the possibility that the parisons may need to be dropped from the intermediate station in the event of a malfunction of the machine.

DISCLOSURE OF INVENTION

According to the invention the glassware forming machine comprises a patter plate movable between an operative position in which it screens the underside of the parison from upraughts and an inoperative position in which the patter plate is not beneath the parison, and moving means operable to move the patter plate between its operative and inoperative positions at appropriate times in the cycle of operation of the machine.

For convenience, the patter plate is pivotally movable between its operative and inoperative positions and is moved to its operative position by the action of a pneumatic piston and cylinder device and is moved to its inoperative position by the action of a spring.

Where the machine is operative to form more than one article of glassware at a time, in order to prevent adjacent parisons at the intermediate station from heating one another, the machine also comprises a shroud assembly at the intermediate station, the shroud assembly being movable between an open position and a closed position in which the shroud assembly co-operates with stationary structure of the machine to substantially surround a parison at the intermediate station.

In order to prevent the shroud assembly from becoming overheated and itself heating the parisons, the shroud assembly is provided with internal passages through which cooling water is passed.

In order to allow for parisons of different lengths, the operative position of the patter plate is vertically adjustable.

BRIEF DESCRIPTION OF DRAWINGS

In the accompanying drawings:

FIG. 3 is a sectional view taken on the line III—III in FIG. 2 but with certain parts omitted; and FIG. 4 is a view similar to FIG. 3 but showing the machine in a different operative position.

BEST MODE OF CARRYING OUT THE INVENTION

Figure 1:
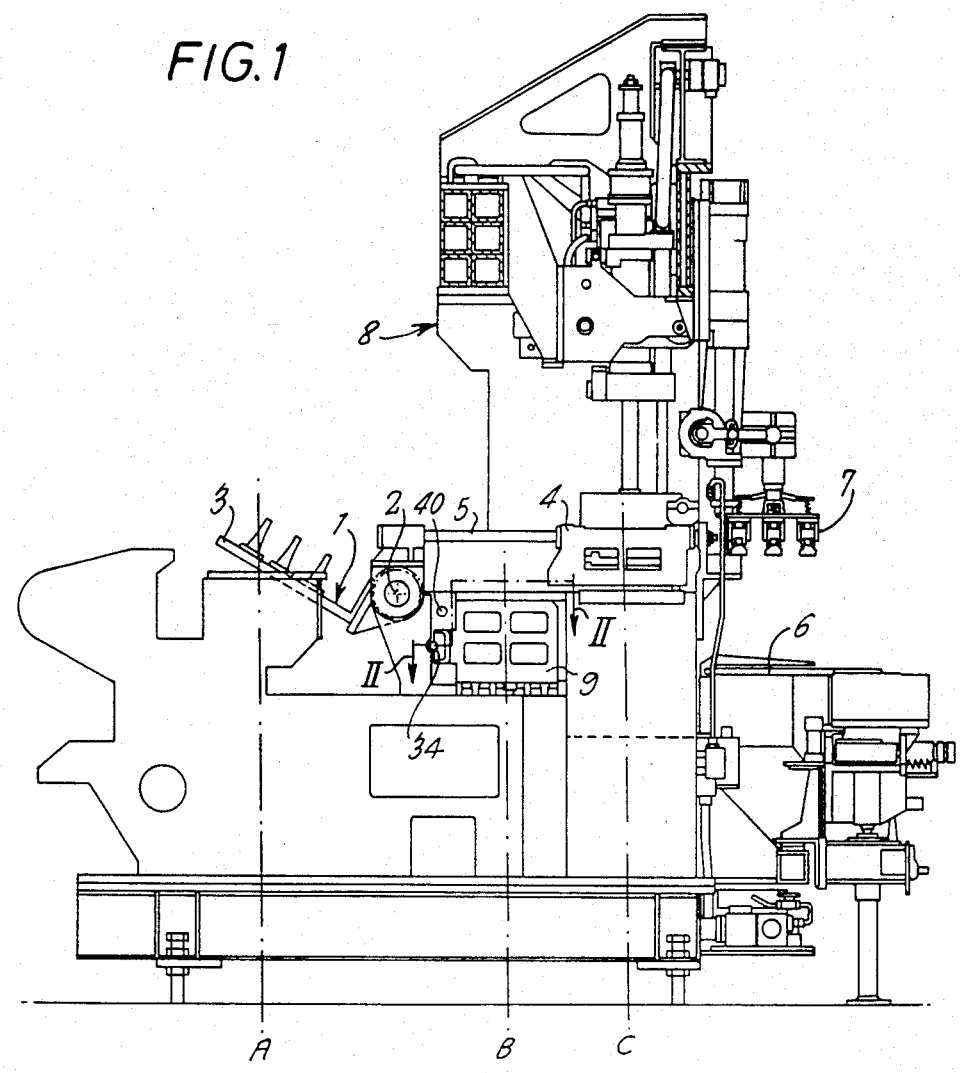
FIG. 1 is a diagrammatic side view of the machine.

The glassware forming machine shown in FIG. 1 is a triple gob three station machine of the individual section type. Gobs of molten glass are fed to three blank moulds at a blank station A where the gobs are formed into parisons. The parisons are formed in an inverted position by pressing or blowing in a conventional manner. A transfer and invert mechanism 1 moves the three parisons formed at the blank station A to an intermediate reheating station B. The mechanism 1 is rotatable about a transverse horizontal axis 2, with a neck ring arm 3 of the mechanism swinging through 180° to transfer the parisons from the blank station A to the intermediate station B. At the intermediate station B, the parisons are received in an upright position by support jaws of a transfer carriage 4. The transfer carriage 4 is horizontally movable along spaced guide rails (one of which is shown at 5 in FIG. 1) between the intermediate station B and a blow station C of the machine. After the support jaws have released the parisons at the blow station C, the parisons are formed into articles of glassware in three blow moulds at the blow station C, the glassware articles being removed from the blow station C and transferred to a dead plate 6 by take-out means 7. FIG. 1 also shows superstructure 8 which applies air to the blow moulds at the blow station C to form the reheating parisons into articles of glassware.

Figure 2:
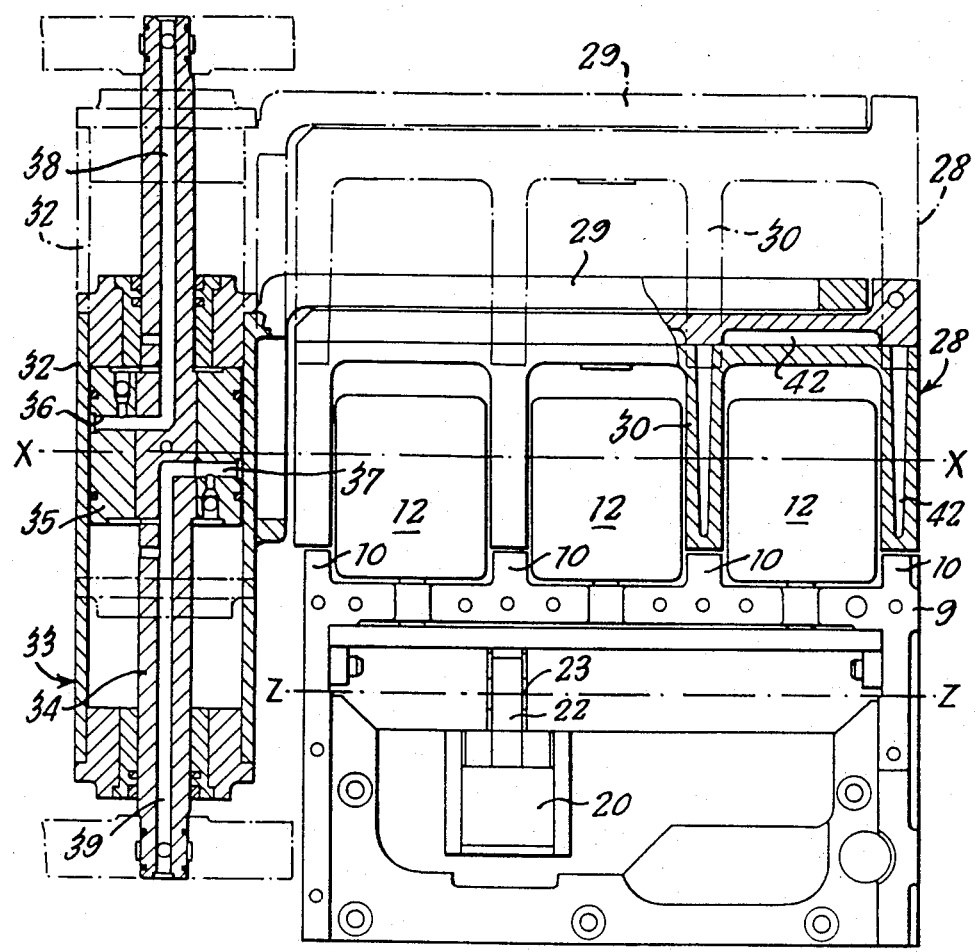
FIG. 2 is a fragmentary part sectional plan view, on an enlarged scale, taken on the line II—II in FIG. 1.

At the intermediate station B, a sub-assembly frame 9 is bolted to the main frame of the machine. As shown in FIG. 2, the sub-assembly frame 9 comprises four spaced lugs 10 projecting towards the central longitudinal axis X—X of the machine. The sub-assembly frame 9 supports three patter plates 12 each of which comprises a substantially rectangular plate of cast iron the shape of which is shown in plan view in FIG. 2. The three patter plates 12 are pivotly mounted about a horizontal axis Z—Z and are capable of pivoting between the raised, operative, position shown in FIG. 2 (and in full line in FIG. 3) and the lowered, inoperative, position shown in broken lines in FIG. 3.

Referring to FIGS. 3 and 4, the sub-assembly frame 9 supports a vertically adjustable assembly 13 on which the three patter plates 12 are pivotally mounted about the axis Z—Z. The vertically adjustable assembly 13 comprises a plate 14 guided for vertical movement with respect to the frame 9, and a block 15 to which is pivotally attached the cylinder of a pneumatic piston and cylinder device 17. The piston rod 18 of the device 17 carries a cap 19 movable within a shroud 20 forming part of the assembly 13. One end of a swing arm 22 is pivotally attached to the cap 19, the other end of the swing arm 22 being attached to a shaft 23 which defines the axis Z—Z and on to which are clamped three support stems 24 of the respective patter plates 12. Air under pressure supplied to the piston and cylinder device 17 causes the three patter plates to be moved to their raised, operative, positions shown in full line in FIG. 3, the patter plates 12 pivoting to their lowered, inoperative, positions shown in broken line in FIG. 3 under the action of a return spring when the air under pressure is disconnected from the piston and cylinder device 17. In modifications of the glassware forming machine shown in the drawings, the device 17 is double acting (dispensing with the return spring). The whole of the assembly 13 is capable of being adjusted in a vertical direction by means of a further pneumatic and piston cylinder device 25 the piston rod 26 of which is attached to the vertically adjustable assembly 13 at 27. FIG. 3 shows the vertically adjustable assembly 13 and the patter plates 12 carried thereby in its uppermost position, and FIG. 4 shows the vertically adjustable assembly 13 and the patter plates 12 in their lowermost position. In FIG. 4 the patter plates are shown in their lowered, inoperative, positions in full line and in their raised, operative, positions in broken line.

Referring to FIG. 2, a shroud (or shield) assembly 28 is also provided at the intermediate station B. The shroud assembly 28 comprises a back plate 29 which carries a finned shroud 30 and which at one end is extended to constitute a movable cylinder 32 of a pneumatic piston and cylinder device 33 arranged laterally across the machine. As can be seen from FIG. 2, the piston and cylinder device 33 has a stationary piston rod 34 to which is attached a block 35 formed with ports 36, 37 which cooperate with respective bores 38, 39 in the piston rod 34 so as to direct air to one side of the block 35 or to the other side thereof. FIG. 2 shows the shroud assembly in its closed position in which the extreme end of the fins oppose, with a small clearance, the respective lugs 10 on the sub-assembly frame 9. The open position of the shroud assembly 28 is shown in broken line in FIG. 2. Additional guidance for the transverse movement of the shroud 70, 28 is provided by a guide rod 40 which extends across the machine frame above the piston rod 34 and one end of which is shown at 40 in FIG. 1. The shroud assembly 28 is thus movable between an open position and a closed position in which the shroud assembly cooperates with stationary structure of the machine to substantially surround a parison at the intermediate station B.

The shroud assembly 28 is provided with internal passages which extend into the fins, as indicated at 42, and in the operation of the machine water is circulated through these passages to cool the shroud assembly 28.

The raising and lowering movement of the patter plates 12, and the opening and closing movement of the shroud assembly 28, are performed in timed relationship with other events of the machine. As soon as the three parisons are delivered to the intermediate station B and are received by the support jaws of the transfer carriage 4, air under pressure is supplied to the pneumatic cylinder 16 to raise the patter plates 12 from their lowered, inoperative, positions to their raised, operative, positions. At the same time, air under pressure is supplied to the lower side of the block 35 (as viewed in FIG. 2) of the piston and cylinder device 33 to cause the shroud assembly 28 to move to its closed position shown in full line in FIG. 2. As a result, the parisons supported by the support jaws at the intermediate station B are substantially enclosed around their sides and are thereby protected from heating one another and the undersides of the parisons are protected from updraughts. Thus, the exchange of heat between parisons is minimised, and the patter plates 12 prevent any substantial updraught of air within the recesses between the fins of the shroud assembly 28, thereby avoiding chilling of the parisons. Thus, even reheating of the parisons at the intermediate station is promoted. Just before the transfer carriage 4 is due to move from the intermediate station B to the blow station C, the shroud assembly 28 is opened and the patter plates 12 are lowered to their inoperative position, allowing the parisons to move away from the station B to the station C. The removal of the patter plates 12 to their inoperative position allows the parisons to be dropped at this stage in the operation of the machine in the event that a malfunction of the machine has been detected. If a series of parisons are to be dropped as cullet at the intermediate station B, as a result of a prolonged machine malfunction, the patter plates 12 are held in their inoperative position all the time, enabling the parisons to fall without obstruction at the station B. The opening and closing movement of the shroud assembly 28 is not suspended since the shroud assembly 28 does not obstruct the parisons as they are dropped at the intermediate station B.

The main function of the patter plates 12 is to prevent an updraught of air from cooling the parisons. The patter plates 12 are positioned at such a level, by means of the piston and cylinder device 25, that the patter plates in their operative position are spaced just below the lowest level to which the parisons are expected to stretch whilst they are reheating at the intermediate station B. However, the patter plates 12 may assist in the further forming of the parisons by carrying inserts which contact the parisons to further form the base or bottom of each parison. Furthermore, the patter plates 12 may be provided with a heat resistant coating, for example of a polytetrafluroethylene carbon material, to protect the patter plates 12 and to prevent the glass of the parisons from sticking to the patter plates 12. This prevents defects in the parisons resulting from contact of the parisons with the colder cast iron of the patter plates 12.

I claim:

1. A glassware forming machine having three stations, namely a blank station at which a parison is formed from a gob of molten glass, an intermediate station at which the parison is allowed to reheat, and a blow station at which the parison is formed into an article of glassware, characterized in that the machine also comprises air screening means comprising a shroud assembly at said intermediate station, moveable between an open position, and a closed position in which the shroud assembly cooperates with stationary structure of the machine to substantially surround a parison and screen the parison from air drafts, said shroud assembly including laterally projecting fins, and moving means to move the shroud assembly between its opened and closed positions at appropriate times in the cycle of operation of the machine.

2. A glassware forming machine according to claim 1 wherein the air screening means further comprises a patter plate movable between an operative position in which it screens the underside of the parison from updrafts of air at the intermediate station and an inoperative position in which the patter plate is not beneath the parison.

3. A glassware forming machine according to claims 1 or 2, wherein the shroud assembly is provided with internal passages through which cooling water is passed during the operation of the machine.

4. A glassware forming machine according to claim 2, characterized in that the patter plate is pivotally movable between its operative and inoperative positions.

5. A glassware forming machine according to claim 4, characterized in that the patter plate is moved to its operative position by the action of a pneumatic piston and cylinder device.

6. A glassware forming machine according to claim 2, characterized by means for vertically adjusting the operative position of the patter plate to suit different lengths of parisons.

7. A glassware forming machine having three stations, namely a blank station at which a parison is formed from a gob of molten glass, an intermediate station at which the parison is allowed to reheat, and a blow station at which the parison is formed into an article of glassware, further comprising:
   air screening means comprising a shroud assembly at said intermediate station, moveable beteen an open position, and a closed position in which the shroud assembly cooperates with stationary structure of the machine to substantially surround a parison and screen the parison from air drafts, said shroud assembly being provided with internal passages through which cooling water is passed during machine operation; and
   moving means to move the shroud assembly between its opened and closed positions at appropriate times in the cycle of operation of the machine.

8. A glassware forming machine according to claim 7 wherein the air screening means further comprises a patter plate mavable between an operative position in which it screens the underside of the parison from updrafts of air at the intermediate station and an inoperative position in which the patter plate is not beneath the parison.

9. A glassware forming machine according to claims 7 or 8, wherein the shroud assembly includes laterally projecting fins.

10. A glassware forming machine according to claim 8, wherein the patter plate is pivotally movable between its operative and inoperative positions.

11. A glassware forming machine according to claim 10, wherein the patter plate is moved to its operative position by the action of a pneumatic piston and cylinder device.

12. A glassware forming machine according to claim 8, further comprising means for vertically adjusting the operative position of the patter plate to suit different lengths of parisons.

* * * * *